(12) United States Patent
Riley

(10) Patent No.: US 7,831,438 B2
(45) Date of Patent: Nov. 9, 2010

(54) LOCAL ITEM EXTRACTION

(75) Inventor: Michael Dennis Riley, New York, NY (US)

(73) Assignee: Google Inc., Mountain View, CA (US)

( * ) Notice: Subject to any disclaimer, the term of this patent is extended or adjusted under 35 U.S.C. 154(b) by 1625 days.

(21) Appl. No.: 11/024,765

(22) Filed: Dec. 30, 2004

(65) Prior Publication Data

US 2006/0149565 A1 Jul. 6, 2006

(51) Int. Cl.
*G06Q 99/00* (2006.01)

(52) U.S. Cl. ............................................... 705/1.1

(58) Field of Classification Search ............ 705/1
See application file for complete search history.

(56) References Cited

U.S. PATENT DOCUMENTS

| 2001/0011270 A1 | 8/2001 | Himmelstein et al. | |
|---|---|---|---|
| 2002/0078035 A1 | 6/2002 | Frank et al. | 707/3 |
| 2002/0156779 A1 | 10/2002 | Elliott et al. | 707/6 |
| 2003/0115189 A1 | 6/2003 | Srinivasa et al. | 707/3 |
| 2004/0078750 A1 | 4/2004 | Frank | |
| 2004/0236730 A1 | 11/2004 | Frank | 707/3 |

FOREIGN PATENT DOCUMENTS

| JP | 2003-524259 A | 8/2003 |
|---|---|---|
| JP | 2005-535039 A | 11/2005 |
| JP | 2006-521621 | 9/2006 |
| WO | WO 01/63479 A1 | 8/2001 |

OTHER PUBLICATIONS

International Search Report for corresponding PCT application with a mailing date of May 17, 2006; 4 pages.
Michael H. Cohen et al.; "Call Connection Via Document Browsing" U.S. Appl. No. 11/169,151, filed Jun. 29, 2005; 45 pages.

*Primary Examiner*—Jonathan Ouellette
(74) *Attorney, Agent, or Firm*—Harrity & Harrity, LLP

(57) ABSTRACT

A system identifies a document that includes an address and locates business information in the document. The system assigns a confidence score to the business information, where the confidence score relates to a probability that the business information is associated with the address. The system determines whether to associate the business information with the address based on the assigned confidence score.

36 Claims, 15 Drawing Sheets

---

Veltri's Pizza

Veltri's Pizza is a small pizza place located at 123 Allegheny Avenue in Oakmont, PA. It's nothing fancy, just a big two-room establishment with a pizza kitchen, plenty of tables and lots of beer.

I recently visited Veltri's Pizza to sample their legendary pie. The small pizza costs about $8, the medium costs $10, and the large costs $12. Toppings vary in price -- I had a small pizza with Canadian Bacon ($3) and Pineapple ($2.50). It's thinly sliced ham in all but name, and the collective juices of the ham and fruit, combined with the cheese, make for a rather soupy, greasy mess below the pizza.

My two companions got their medium pie with cheese and Onions ($1.50), Green Peppers ($1.50), and Black Olives ($1.50), which were shoveled on like coal. They were impressed with the flavor and resilience of the crust when placed under such stress.

I was given this piece of advice by a longtime Veltri's pizza aficionado: Never ask for "extra" anything. They take it as an insult and might give you a foot-high mound of greasy pepperoni or something. I made sure to follow this advice.

To order Veltri's famous pizza, you can call them at 412-828-9014 or fax your order to them at 412-828-9015 and they will have it ready for you when you arrive.

Veltri's Pizza

Veltri's Pizza is a small pizza place located at 123 Allegheny Avenue in Oakmont, PA. It's nothing fancy, just a big two-room establishment with a pizza kitchen, plenty of tables and lots of beer.

I recently visited Veltri's Pizza to sample their legendary pie. The small pizza costs about $8, the medium costs $10, and the large costs $12. Toppings vary in price -- I had a small pizza with Canadian Bacon ($3) and Pineapple ($2.50). It's thinly sliced ham in all but name, and the collective juices of the ham and fruit, combined with the cheese, make for a rather soupy, greasy mess below the pizza.

My two companions got their medium pie with cheese and Onions ($1.50), Green Peppers ($1.50), and Black Olives ($1.50), which were shoveled on like coal. They were impressed with the flavor and resilience of the crust when placed under such stress.

I was given this piece of advice by a longtime Veltri's pizza aficionado: Never ask for "extra" anything. They take it as an insult and might give you a foot-high mound of greasy pepperoni or something. I made sure to follow this advice.

To order Veltri's famous pizza, you can call them at 412-828-9014 or fax your order to them at 412-828-9015 and they will have it ready for you when you arrive.

FIG. 1

The REAL Potato

No one can fault Morton's for the quality of their menu items. They only use prime USDA aged beef, which is among the best in the world. They char-broil it at an extremely high temperature and serve it exactly as ordered.

I recently visited Morton's at 123 Connecticut Avenue, Washington, DC 20200. My $46 14 oz. Double Filet Mignon was a fabulous piece of meat served medium well, exactly as requested. The steak was great and the service was excellent, but all you get for the price is the steak. The potato, the vegetables, everything else, with the exception of the bread, is extra.

The soups, hors d'oeuvres, appetizers, and side orders are very expensive. My $12 Lobster bisque was a huge disappointment. The $8 potato I ordered, however, was enormous and extremely tasty. Not quite sure it was worth $8 though. The raspberry dessert was fabulous.

Morton's is an excellent restaurant choice to reward an important client. This is a place which most people would like to try at least once but it's not a restaurant offering great value. It's a good place to visit when someone else is paying the bill. You can make reservations at the Washington, DC Morton's by calling 202-987-6543 or you can fax your order to 202-987-6542 and it will be ready for you when you arrive.

Rating: 3+ Stars

FIG. 9

I recently visited Morton's at 123 Connecticut Avenue, Washington, DC 20200. My $46 14 oz. Double Filet Mignon was a fabulous piece of meet served medium well, exactly as requested. The steak was great and the service was excellent, but all you get for the price is the steak. The potato, the vegetables, everything else, with the exception of the bread, is extra.

FIG. 10

I recently visited Morton's at 123 Connecticut Avenue, Washington, DC 20200. My $46 14 oz. Double Filet Mignon was a fabulous piece of meet served medium well, exactly as requested. The steak was great and the service was excellent, but all you get for the price is the steak. The potato, the vegetables, everything else, with the exception of the bread, is extra.

I recently visited Morton's at 123 Connecticut Avenue, Washington, DC 20200. My $46 14 oz. Double Filet Mignon was a fabulous piece of meet served medium well, exactly as requested. The steak was great and the service was excellent, but all you get for the price is the steak. The potato, the vegetables, everything else, with the exception of the bread, is extra.

I recently visited Morton's at 123 Connecticut Avenue, Washington, DC 20200. My $46 14 oz. Double Filet Mignon was a fabulous piece of meet served medium well, exactly as requested. The steak was great and the service was excellent, but all you get for the price is the steak. The potato, the vegetables, everything else, with the exception of the bread, is extra.

Morton's is an excellent restaurant choice to reward an important client This is a place which most people would like to try at least once but it's not a restaurant offering great value. It's a good place to visit when someone else's is paying the bill. You can make reservations at the Washington, DC Morton's by calling 202-987-6543 or you can fax your order to 202-987-6542 and it will be ready for you when you arrive.

FIG. 14

Morton's
(202) 987-6543        123 Connecticut Ave, Washington, DC

... Morton's is an excellent restaurant choice to reward an important client This is a place which most people would like to try at least once but it's not a restaurant offering great value. It's a good place to visit when someone else's is paying the bill.
...

restaurantreviews.com - 10 more >>

FIG. 15

LOCAL ITEM EXTRACTION

BACKGROUND

1. Field of the Invention

Implementations described herein relate generally to local information retrieval and, more particularly, to the identification of business information associated with an address.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search systems attempt to return hyperlinks to web pages in which a user is interested. Generally, search systems base their determination of the user's interest on search terms (called a search query) entered by the user. The goal of the search system is to provide links to high quality, relevant results (e.g., web pages) to the user based on the search query. Typically, the search system accomplishes this by matching the terms in the search query to a corpus of pre-stored web pages. Web pages that contain the user's search terms are "hits" and are returned to the user as links.

Local search systems attempt to return relevant web pages and/or business listings within a specific geographic area. When a business is mentioned on a web page, existing local search systems may match the business with yellow pages data to identify the corresponding business listing. This technique is not practicable, however, when no yellow pages data exists or the yellow pages data is incorrect for a business.

SUMMARY

According to one aspect, a method may include identifying a document that includes an address, locating business information in the document, and assigning a confidence score to the business information, where the confidence score may relate to a probability that the business information is associated with the address. The method may also include determining whether to associate the business information with the address based on the assigned confidence score.

According to another aspect, a method may include identifying a document that includes an address, identifying a set of terms that precede the address in the document, and determining a probability that each of the terms is part of a title associated with the address. The method may also include identifying a candidate title based on one or more of the terms that have a high probability of being part of a title associated with the address, assigning a confidence score to the candidate title, and determining whether to associate the candidate title with the address based on the assigned confidence score.

According to yet another aspect, a method may include identifying a document that includes an address, identifying a set of candidate telephone numbers in the document, determining a probability that each candidate telephone number in the set of candidate telephone numbers is associated with the address, and determining whether to associate one of the candidate telephone numbers with the address based on the determined probability.

According to a further aspect, a method may include identifying a web page that includes a landmark, identifying an attribute in the web page, and assigning a confidence score to the attribute, where the confidence score may relate to a probability that the attribute is associated with the landmark. The method may also include determining whether to associate the attribute with the landmark based on the assigned confidence score.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 is a diagram of an example document that includes an address;

FIGS. 9-15 are diagrams that illustrate processing that may be performed on an exemplary document according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Overview

Local searching involves identifying business listings associated with a particular geographic area. The web includes billions of documents, some of which may mention a business. It is beneficial to local search systems to identify business information associated with as many different businesses as possible. Often, yellow pages data is associated with the business. Sometimes, however, a business is mentioned in a document for which there is no yellow pages data or the yellow pages data is possibly incorrect.

Systems and methods consistent with the principles of the invention may identify business information associated with an address mentioned in a web document. In one implementation, the business information includes the name of a business associated with the address. In another implementation, the business information includes a telephone number associated with the address. In yet another implementation, the business information may include another type of information, such as business hours or a link to a web site or map for a business associated with the address.

FIG. 1 is a diagram of an example document that includes an address. As shown, the document is associated with a review of Veltri's Pizza—a restaurant located in Oakmont, Pa. The document may be analyzed to determine that the document includes a postal address (i.e., 123 Allegheny Avenue, Oakmont, Pa.). Assume that Veltri's does not have any associated yellow pages data or has possibly incorrect yellow pages data.

Using techniques described herein, the document may be further analyzed to determine business information associated with the address. The business information may include a business name (also referred to herein as a "title") and/or a telephone number associated with the address. The business information may be used to create or correct a business listing associated with the address.

A "document," as the term is used herein, is to be broadly interpreted to include any machine-readable and machine-storable work product. A document may include, for example, an e-mail, a web site, a business listing, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
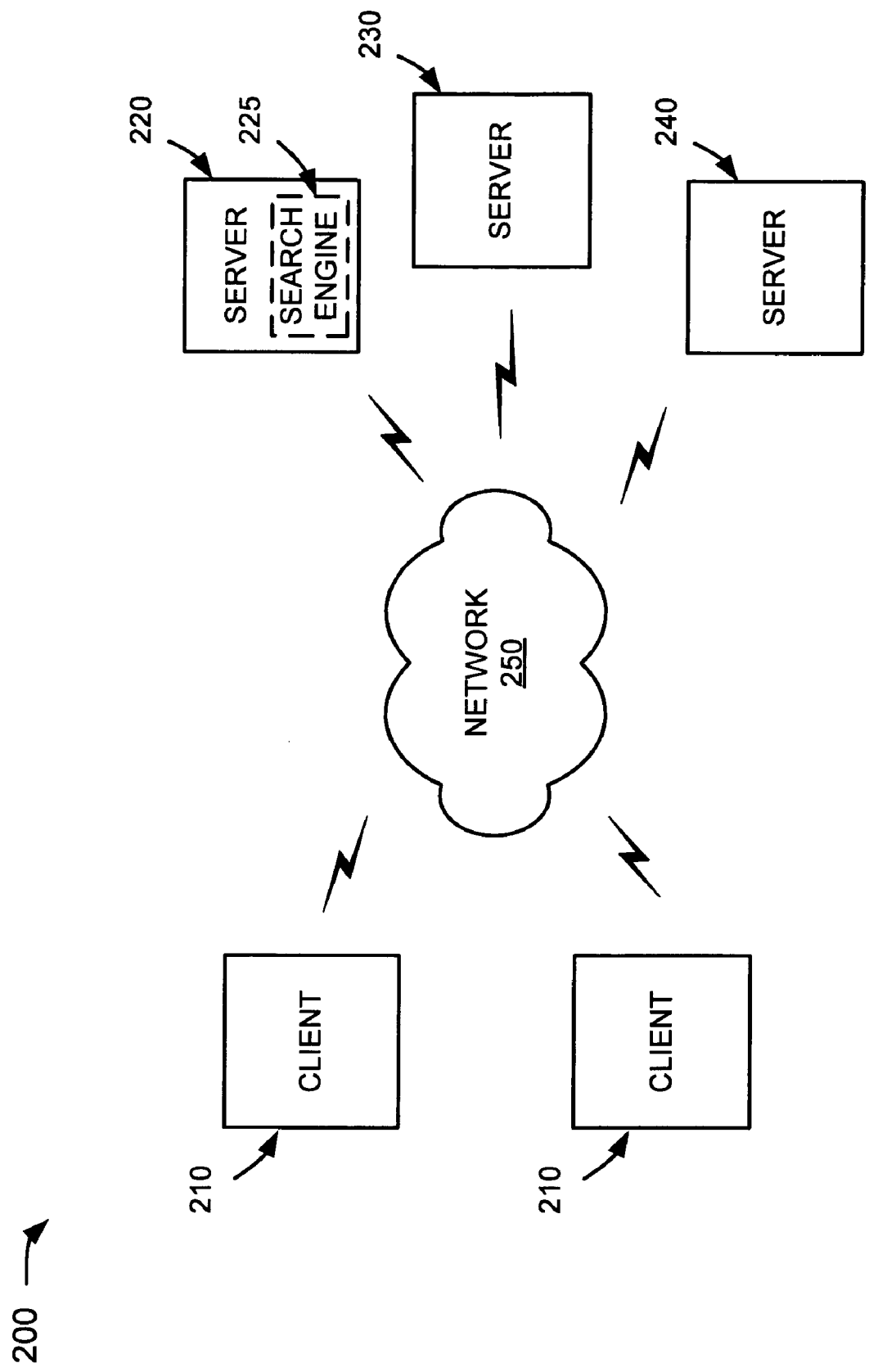
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search engine 225 usable by clients 210. Server 220 may crawl a corpus of documents (e.g., web documents), index the documents, and store information associated with the documents in a repository of documents. Servers 230 and 240 may store or maintain documents that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, a memory device, or a combination of networks. Clients 210 and servers 220-240 may connect to network 250 via wired, wireless, and/or optical connections.

Exemplary Client/Server Architecture

Figure 3:
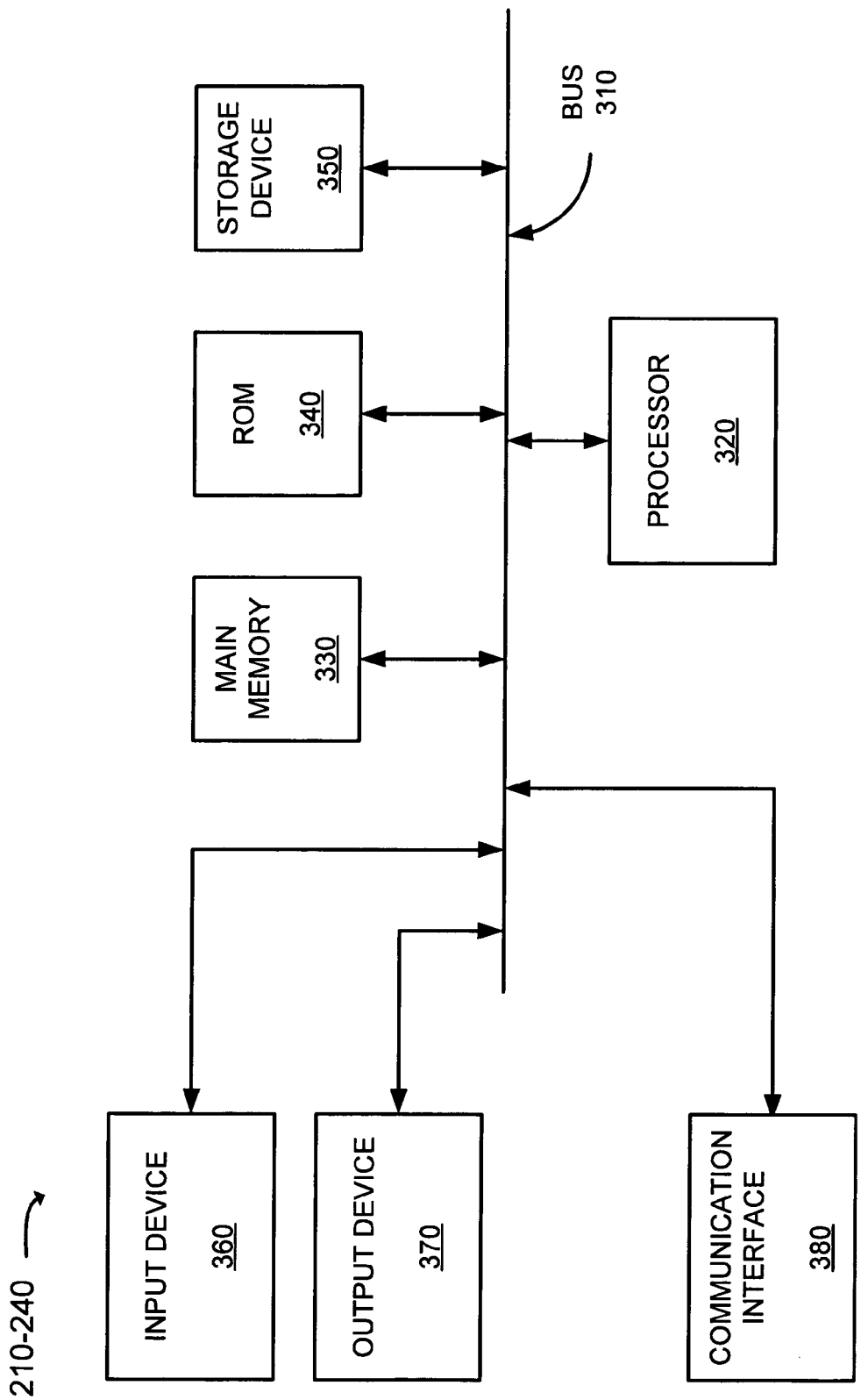
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-240, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that interprets and executes instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

The client/server entity, consistent with the principles of the invention, may perform certain operations, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Training System

Figure 4:
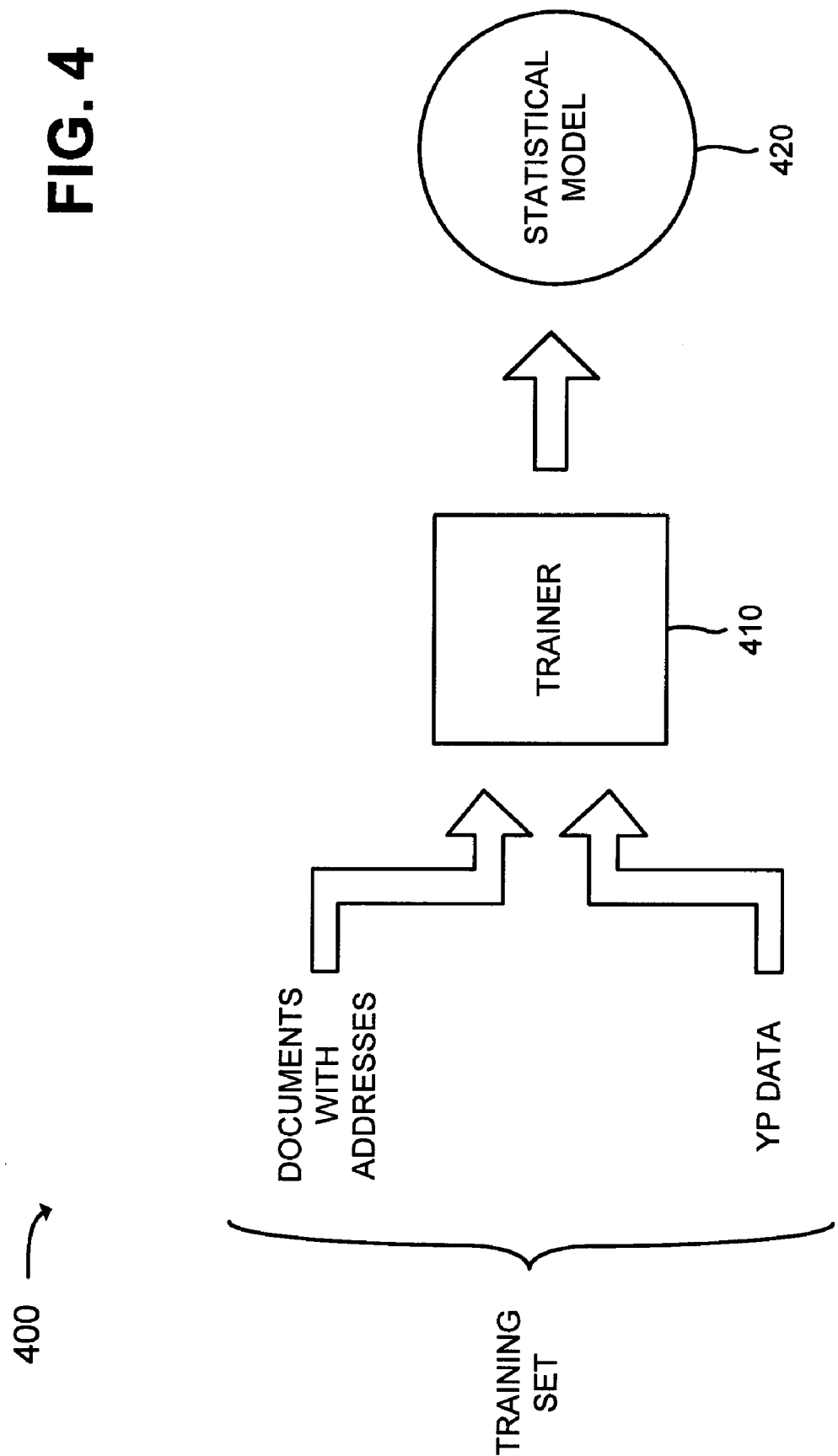
FIG. 4 is an exemplary diagram of a training system according to an implementation consistent with the principles of the invention.

FIG. 4 is an exemplary diagram of a training system 400 according to an implementation consistent with the principles of the invention. In one implementation, training system 400 may be implemented by software and/or hardware within server 220 (FIG. 2), another device, or a group of devices separate from or including server 220.

As shown in FIG. 4, training system 400 may include a trainer 410 that generates a statistical model 420 based on a training set. In one implementation, a set of documents that include addresses for which there is yellow pages (yp) data may be identified. Generally, trainer 410 may identify features commonly associated with business information in the set of documents for which there is yellow pages data to generate statistical model 420. Statistical model 420 may be used to predict where business information may be located within documents that include addresses for which there is no yellow pages data or possibly incorrect yellow pages data.

Figure 5:
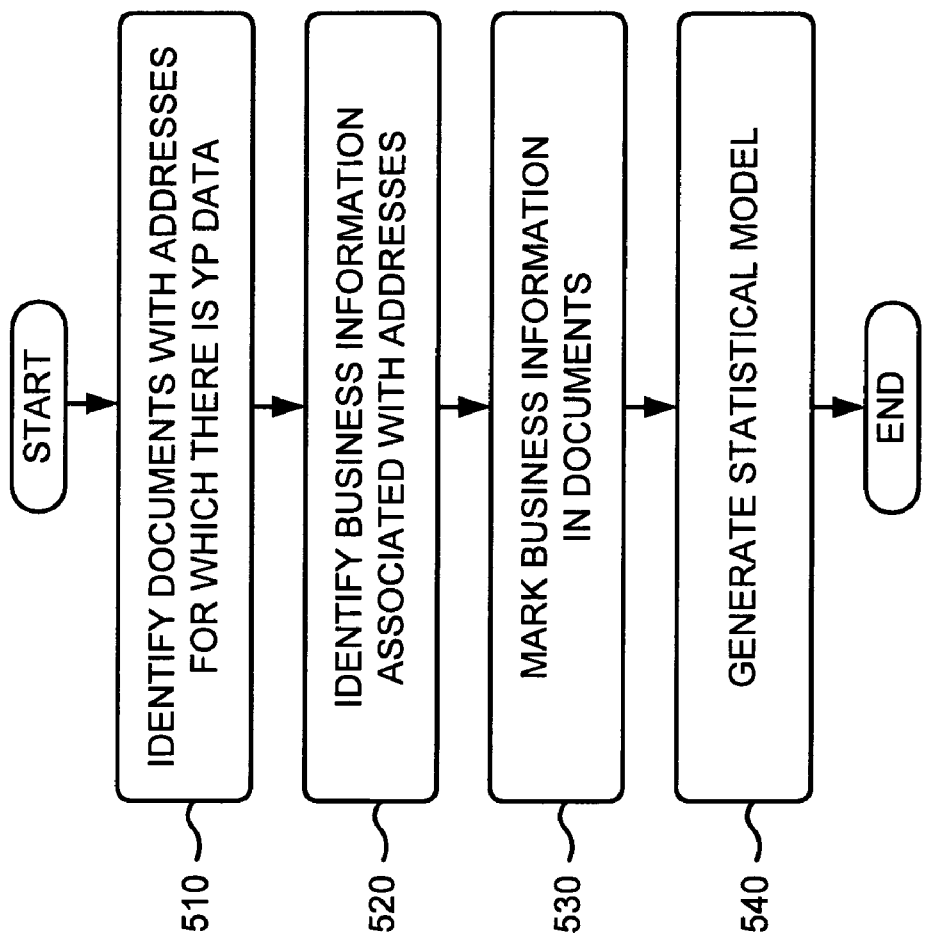
FIG. 5 is a flowchart of exemplary processing for training a statistical model according to an implementation consistent with the principles of the invention.

FIG. 5 is a flowchart of exemplary processing for training statistical model 420 according to an implementation consistent with the principles of the invention. Processing may begin with analyzing a corpus of documents to identify documents that include addresses for which there is yellow pages data (block 510). For example, documents in the document corpus may be analyzed to determine whether the documents include addresses. Any well known address recognition technique may be used to recognize an address in a document.

When a document is identified as including an address, the address may be analyzed against yellow pages data to determine whether the yellow pages data includes a business listing that matches the address. From the yellow pages' business listing, business information, such as the business's name ("title") and/or telephone number may be identified. This business information may then be identified within the document (block 520). For example, the text of the document may be analyzed to determine whether any of the text matches the business information.

When none of the text matches the business information, the document may be removed from the training set. When text of the document matches the business information, the address and business information may be marked within the document (block 530) and the document may be included in the training set. Any well known marking technique may be used to mark the address and business information in the document. In one implementation, only documents for which the business information occurs around the address (e.g., within a predetermined number of terms, such as 20 or 60 terms to the left and/or right of the address) may be included in the training set. In another implementation, documents for which the business information occurs anywhere in the document may be included in the training set.

Once the training set has been established, which may include millions of documents, a statistical model may be generated based on the training set (block 540). For example, the documents in the training set may be analyzed to collect features regarding how to recognize business information in a document when the document includes an address. The features may be associated with the distance that a candidate term is from a reference point (e.g., the address in the document), characteristics of the candidate term, boundary information associated with the candidate term, and/or punctuation information associated with the candidate term. The particular features that are useful to determine a title may differ from those features that are useful to determine a telephone number. The features may differ still for determining other types of business information.

Examples of features relating to characteristics of a candidate title term might include what the term is, whether it is a number, whether it is capitalized, uppercase, bolded, italicized, underlined, or centered, whether it is part of anchor text, and what its length is in characters. Examples of features relating to boundary information for a candidate title term might be based on the presence of boundary markings (e.g., HTML tags) and might include whether there is a paragraph, break, or list item marker and whether there is a marker relating to the beginning or end of a table or list between the candidate title term and a preceding or following term. Examples of features relating to punctuation information for a candidate title term might include whether there is a comma, period, exclamation point, question mark, colon, semicolon, dash, single or double quote, a bracket, or a space between the candidate title term and a preceding or following term. Other features would be apparent to one skilled in the art.

Examples of features relating to characteristics of a candidate telephone number term might include what the term is, what its length is in characters, and if the telephone includes an area code, whether the area code appears appropriate for the geographic area in which the address is located. Examples of features relating to boundary information for a candidate telephone number term might be based on the presence of boundary markings (e.g., HTML tags) and might include whether there is a paragraph, break, or list item marker and whether there is a marker relating to the beginning or end of a table or list between the candidate telephone number term and the address. Some other features that are relevant to candidate telephone number terms might include whether common telephone number terms (e.g., call, calling, telephone, telephoning, phone, phoning, tel, tele, (T), etc.) appear within a predetermined number of terms before the candidate telephone number term, whether common facsimile number terms (e.g., fax, faxing, (F), etc.) appear within a predetermined number of terms before the candidate telephone number term, whether there is another telephone number between the candidate telephone number term and the address. Other features would be apparent to one skilled in the art.

The statistical model may be used, based on the features associated with a term in a document, to predict whether the term is part of the business information associated with an address in the document. In other words, the statistical model may identify a number of different clues from the training set and use these clues to determine where a title is likely to begin and end within a document and/or which telephone number likely corresponds to an address in the document.

Exemplary Local Item Extractor

Figure 6:
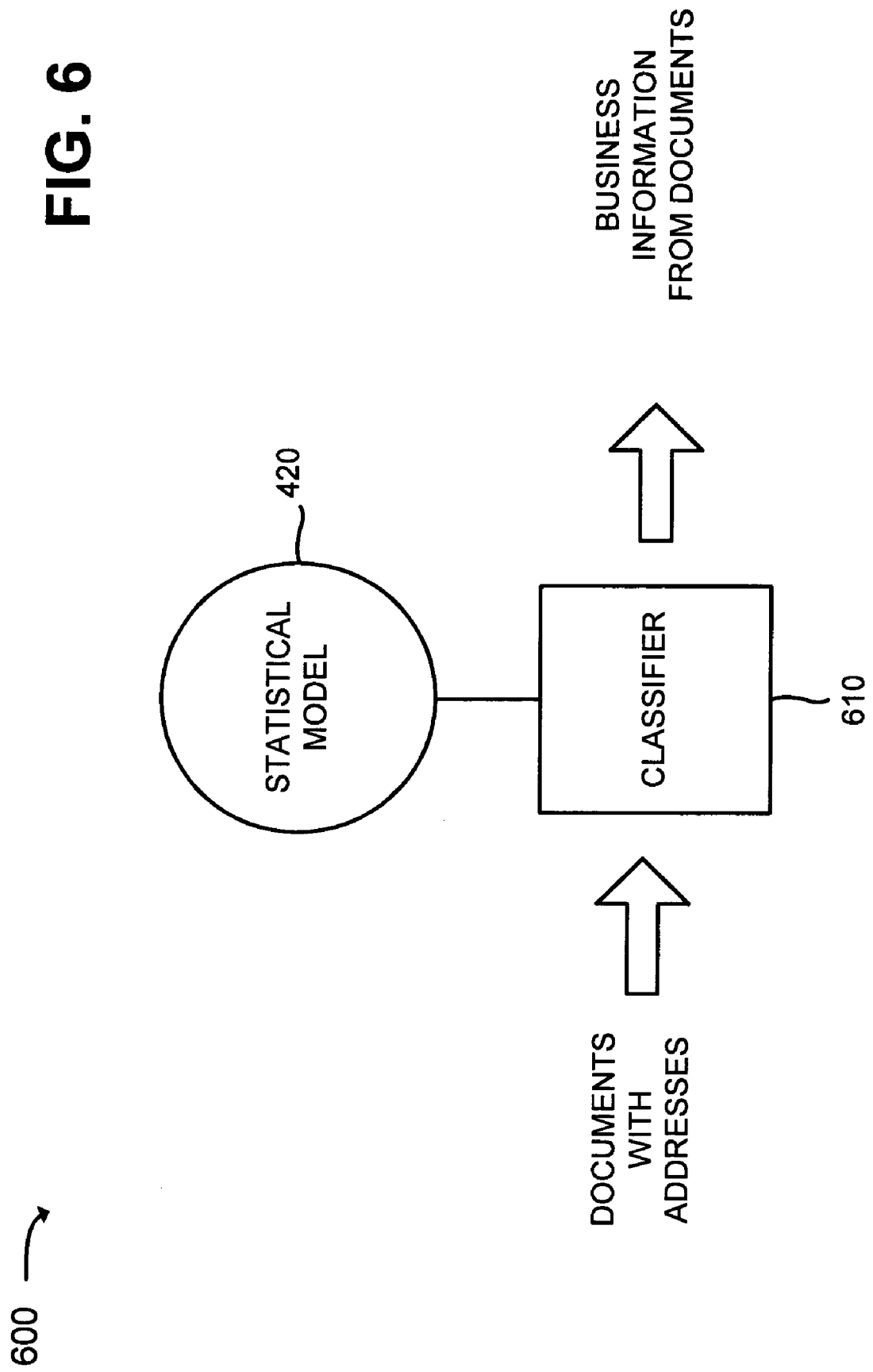
FIG. 6 is an exemplary diagram of a local item extractor according to an implementation consistent with the principles of the invention.

FIG. 6 is an exemplary diagram of a local item extractor 600 according to an implementation consistent with the principles of the invention. In one implementation, local item extractor 600 may be implemented by software and/or hardware within server 220 (FIG. 2), another device, or a group of devices separate from or including server 220.

As shown in FIG. 6, local item extractor 600 may include a classifier 610 that may analyze documents with addresses to determine business information associated with the addresses based on statistical model 420. The documents analyzed by classifier 610 may include documents with addresses for which there is no corresponding yellow pages data and/or documents with addresses for which there is possibly incorrect yellow pages data. The functions performed by classifier 610 may differ based on whether the business information corresponds to business name (title) information or telephone number information. Yet other functions may be performed when the business information includes information other than business name or telephone number information.

Figure 7:
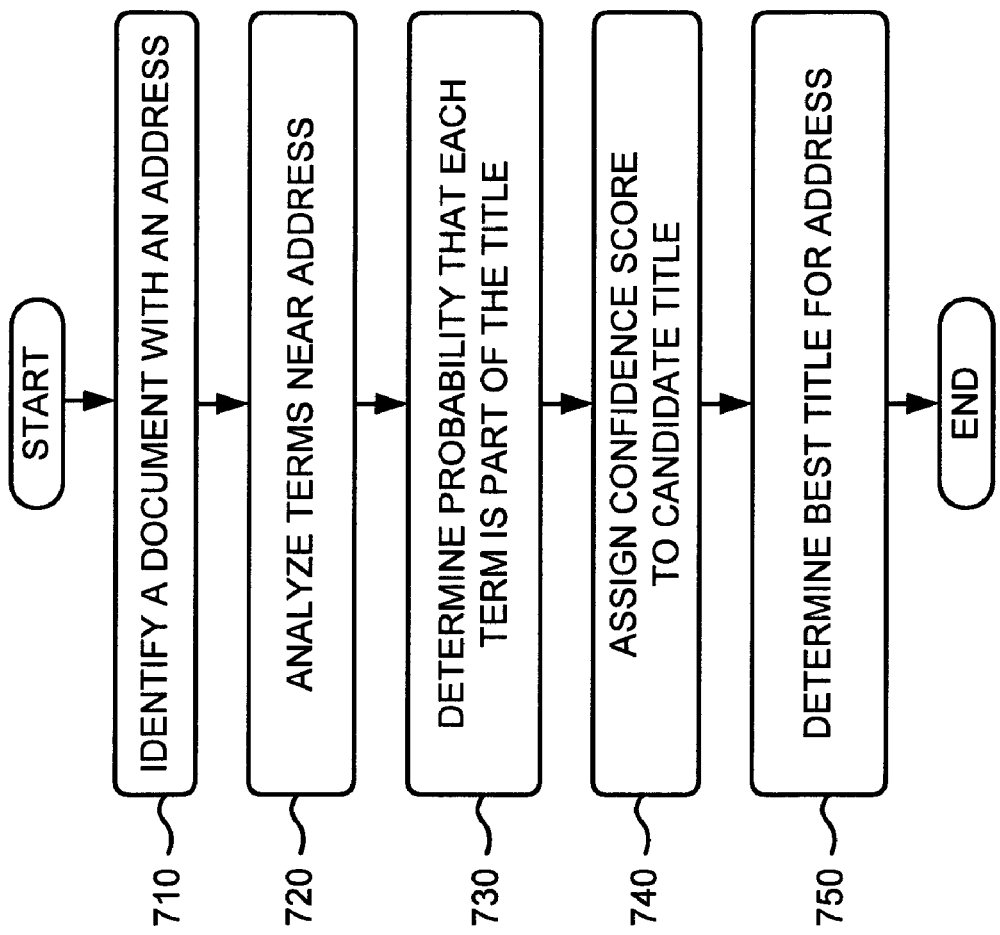
FIG. 7 is a flowchart of exemplary processing for identifying a business name (title) associated with an address according to an implementation consistent with the principles of the invention.

FIG. 7 is a flowchart of exemplary processing for identifying a business name (title) associated with an address according to an implementation consistent with the principles of the invention. Processing may begin with the identification of a document that contains an address (block 710). Any well known address recognition technique may be used to recognize an address in a document.

Terms near the address may be analyzed and the probability that each term is part of the title may be determined (blocks 720 and 730). In one implementation, analysis may begin with the term that immediately precedes the address in the document. In other words, the search for the title may begin at the address and look backward in the text of the document. The theory is that when a title occurs in a document in association with an address, it almost always occurs before the address in the document.

When analyzing a candidate term, it may be determined, based on the statistical model, the probability that the candidate term is part of the title given the prediction regarding the preceding term and given a window of terms (e.g., looking at a predetermined number of terms to the left and right) around the candidate term. The probability determination may be based on the features of the candidate term and other terms in the window. The features associated with the candidate term might include, for example, the distance of the candidate term from the address, characteristics of the candidate term, boundary information between the candidate term and a preceding or following term, and/or punctuation information between the candidate term and a preceding or following term.

Let t(i), which is either 0 or 1, be the prediction of whether the ith term preceding the beginning of the address is (=1) or is not (=0) a term in the title. Let x(i) be the ith term itself, s(i) be attributes of x(i) (e.g., distance and characteristics), h(i) be the boundary information between x(i) and a following (or preceding) term, and q(i) be the punctuation information between x(i) and a following (or preceding) term. Then the probability that x(i) is part of the title conditioned on its context may be represented by:

$$F(i)=\text{Prob}[t(i) \text{ given } x(i+2)x(i+1)x(i)x(i-1)x(i-2), s(i+2)s(i+1)s(i)s(i-1)s(i-2), h(i+1)h(i)h(i-1)h(i-2), q(i+1)q(i)q(i-1)q(i-2), t(i-1)],$$

where $x(i+2)x(i+1)x(i)x(i-1)x(i-2)$ may refer to the window of terms around x(i) (while the window of terms is shown as two to the left and two to the right of x(i), the window may be bigger or smaller in other implementations consistent with the principles of the invention), $s(i+2)s(i+1)s(i)s(i-1)s(i-2)$ may refer to the attributes of the terms in the window, $h(i+1)h(i)h(i-1)h(i-2)$ may refer to boundary information between the terms in the window, $q(i+1)q(i)q(i-1)q(i-2)$ may refer to punctuation information between the terms in the window, and t(i−1) may refer to the prediction concerning the term preceding x(i) (i.e., x(i−1)).

Let $X=x(n)x(n-1)\ldots x(2)x(1)$, where n refers to the size of the text string that is considered (e.g., 20 terms), $S=s(n)s(n-1)\ldots s(2)s(1)$, $H=h(n-1)\ldots h(2)h(1)$, $Q=q(n-1)\ldots q(2)q(1)$, and $T=t(n)t(n-1)\ldots t(2)t(1)$. The probability of the whole string may then be determined from Prob(T given X, S, H, Q). Based on the definition of conditional probability and a Markov-like assumption (i.e., only local context matters), the probability of the string may be represented by:

$$\text{Prob}(T \text{ given } X, S, H, Q)=k\, F(n)F(n-1)\ldots F(2)F(1),$$

where k is a constant for this context and where the t(i) and t(i−1) in F(i) on the right hand side of the equation matches what is in T on the left hand side of the equation.

T may then be chosen to maximize Prob(T given X, S, H, Q) subject to the constraint that all the 1's in T are contiguous.

To do this, an exhaustive search may be performed over all $2^n$ T's and Prob(T given X, S, H, Q) may be evaluated for each T. To obtain just the best title, a well known single-source shortest path algorithm may be used. To obtain the j best titles, a well known j-best algorithm may be used.

A confidence score may be assigned to each candidate title that is identified (block 740). The confidence score may be related to the probability associated with the title (e.g., Prob(T given X, S, H, Q). Optionally, the best title for the address may be determined from the set of candidate titles (block 750). In one implementation, the best title for the address may be identified as the candidate title with the highest confidence score. In another implementation, when the address appears in a group of documents, the best title for the address may be identified as the candidate title with the highest confidence score across the group of documents or the candidate title with the highest confidence score that appears in the most documents in the group of documents.

The title may then be associated with the address to form or supplement a business listing. The address with its associated title may be stored together in a memory.

Figure 8:
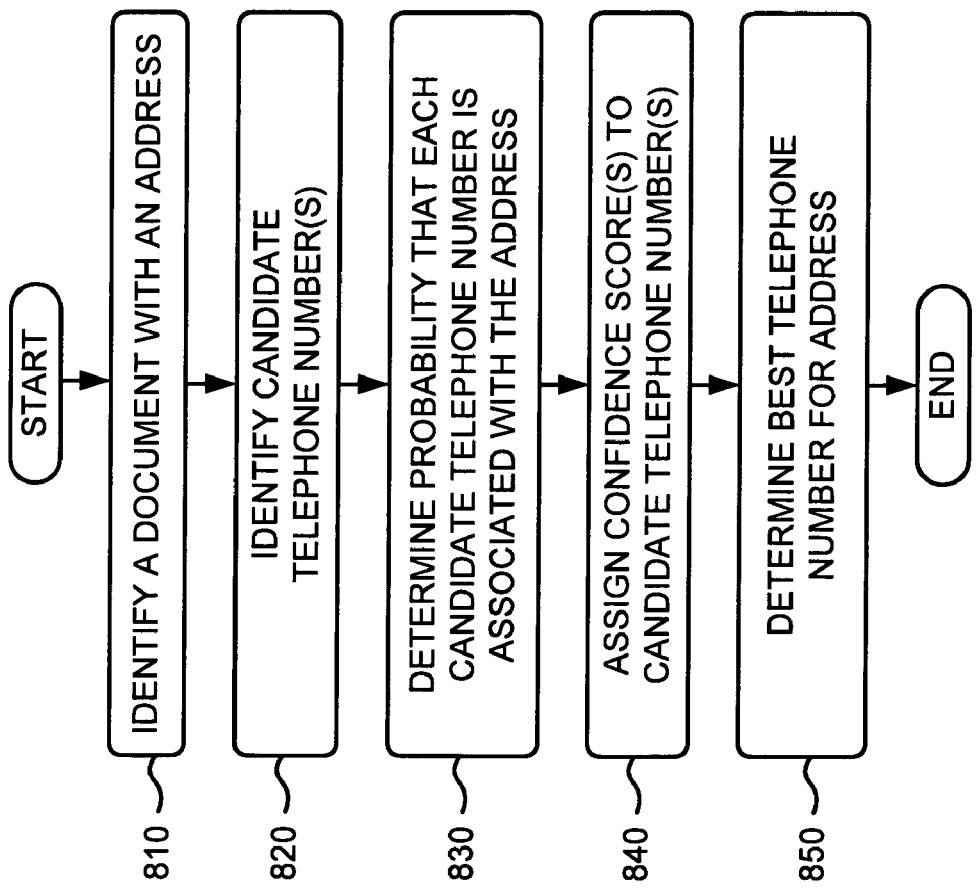
FIG. 8 is a flowchart of exemplary processing for identifying a telephone number associated with an address according to an implementation consistent with the principles of the invention.

FIG. 8 is a flowchart of exemplary processing for identifying a telephone number associated with an address according to an implementation consistent with the principles of the invention. Processing may begin with the identification of a document that contains an address (block 810). Any well known address recognition technique may be used to recognize an address in a document.

A set of candidate telephone numbers in the document may be identified (block 820). In one implementation, all telephone numbers in the document may be identified as candidate telephone numbers. In another implementation, telephone numbers within a certain distance of the address may be identified. Any well known pattern matching technique may be used to identify the set of candidate telephone numbers.

It may be determined, based on the statistical model, the probability that each of the candidate telephone numbers is associated with the address given the prediction regarding the preceding candidate telephone number and given a window of terms (e.g., looking at a predetermined number of terms to the left and right) around the candidate telephone number (block 830). The probability determination may be further based on the features associated with the candidate telephone number. The features might include, as explained above, the distance of candidate telephone number from the address, characteristics of the candidate telephone number, boundary information between the candidate telephone number and the address, and/or punctuation information between the candidate telephone number and the address. The probability may be determined in a manner similar to that described above with regard to titles, where x(i), in this case, refers to a candidate telephone number.

Confidence scores may be assigned to the candidate telephone numbers based on their determined probabilities (block 840). Optionally, a best telephone number for the address may be determined (block 850). In one implementation, the best telephone number for the address may be identified as the candidate telephone number with the highest confidence score. In another implementation, when the address appears in a group of documents, the best telephone number for the address may be identified as the candidate telephone number with the highest confidence score across the group of documents or the candidate telephone number with the highest confidence score that appears in the most documents in the group of documents.

The telephone number may then be associated with the address to form or supplement a business listing. The address with its associated telephone number may be stored together in a memory.

EXAMPLE

FIGS. 9-15 are diagrams that illustrate processing that may be performed on an exemplary document according to an implementation consistent with the principles of the invention. As shown in FIG. 9, the document is a web page associated with a review of Morton's restaurant located in Washington, D.C. The web page may be analyzed using a well known address recognition technique to determine that the web page includes a postal address. As shown in FIG. 10, the address corresponds to 123 Connecticut Avenue, Washington, D.C. 20200. Assume that Morton's does not have any associated yellow pages data or has possibly incorrect yellow pages data.

Figure 11:

When attempting to identify a business name (title) associated with the address, the search may begin at the term immediately preceding the address and go backwards. In this case, the search may begin with the term "at," as shown in FIG. 11. It may be determined what the probability is that candidate term "at" is part of the title given a window of terms around the candidate term, features associated with the terms in the window, and the prediction associated with the previous term.

The probability may be expressed as F(at)=Prob[t(at) given "visited Morton's at 123 Connecticut," s(visited)s(Morton's) s(at)s(123)s(Connecticut), h(Morton's)h(at)h(123)h(Connecticut), q(Morton's)q(at)q(123)q(Connecticut), 0], where, for example, s(at) may refer to attributes of the term "at," h(at) may refer to boundary information between the term "at" and the following term "Morton's," q(at) may refer to punctuation information between the term "at" and the following term "Morton's," and "0" refers to the prediction regarding the prior term, which in this case, corresponds to part of the address. While this simple example assumes a two term window to the left and right of the candidate term, the window may be larger or smaller in practice.

The attributes associated with the candidate term "at" might include the distance of the term "at" from the address. In this case, the term "at" immediately precedes the address. The attributes might also include characteristics of the term "at." In this case, the term is "at;" it is not a number; it is not capitalized, uppercase, bolded, italicized, underlined, or centered; it is not part of anchor text; and it is two characters in length. For the boundary information, assume that there are no boundary markers to the left (or right) of the term "at." Also, there is no punctuation to the left (or right) of the term "at." Assume that the probability determination results in a prediction that the term "at" is not part of the title (e.g., t(at)=0).

Figure 12:

The search may continue with the term "Morton's," as shown in FIG. 12. It may be determined what the probability is that the candidate term "Morton's" is part of the title given a window of terms around the candidate term, features associated with the terms in the window, and the prediction associated with the previous term.

The probability may be expressed as P(Morton's)=Prob[t (Morton's) given "recently visited Morton's at 123," s(recently)s(visited)s(Morton's)s(at)s(123), h(visited)h(Morton's)h(at)h(123), q(visited)q(Morton's)q(at)q(123), 0]. The attributes associated with the term "Morton's" might include the distance of the term "Morton's" from the address. In this case, the term "Morton's" is one term away from the address. The attributes might also include characteristics of the term "Morton's." In this case, the term is "Morton's;" it is not a number; it's first character is capitalized; it is not uppercase, bolded, italicized, underlined, or centered; it is not part of anchor text; and it is eight characters in length. For the boundary information, assume that there are no boundary markers to the left (or right) of the term "Morton's." Also, there is no punctuation to the left (or right) of the term "Morton's." Assume that the probability determination results in a prediction that the term "Morton's" is part of the title (e.g., t(Morton's)=1).

Figure 13:

The search may continue with the term "visited," as shown in FIG. 13. It may be determined what the probability is that the candidate term "visited" is part of the title given a window of terms around the candidate term, features associated with the terms in the window, and the prediction associated with the previous term.

The probability may be expressed as P(visited)=Prob[t (visited) given "I recently visited Morton's at," s(I)s(recently) s(visited)s(Morton's)s(at), h(recently)h(visited)h(Morton's) h(at), q(recently)q(visited)q(Morton's)q(at), 1]. The attributes associated with the term "visited" might include the distance of the term "visited" from the address. In this case, the term "visited" is two terms away from the address. The attributes might also include characteristics of the term "visited." In this case, the term is "visited;" it is not a number; it is not capitalized, uppercase, bolded, italicized, underlined, or centered; it is not part of anchor text; and it is seven characters in length. For the boundary information, assume that there are no boundary markers to the left (or right) of the term "visited." Also, there is no punctuation to the left (or right) of the term "visited." Assume that the probability determination results in a prediction that the term "visited" is not part of the title (e.g., t(visited)=0).

Once a prediction is made whether each of the candidate terms is part of the title (for some set of terms in the web page or all of the terms in the web page), a sliding string of terms may be considered to identify a string that maximizes the probability that the terms of the string include the title. Assume that this processing identifies the term "Morton's" as a candidate title for the address. A confidence score may be assigned to the candidate title, as described above.

When attempting to identify a telephone number associated with the address, the search may begin by identifying all of the telephone numbers in the web page using a well known pattern matching technique, as shown in FIG. 14. In this case, there were two candidate telephone numbers identified: 202-987-6543 and 202-987-6542.

It may be determined what the probability is that each of the candidate telephone numbers is the telephone number for the address given a window of terms around the candidate telephone number, features associated with the candidate telephone number, and the prediction associated with the previous telephone number. The features associated with the candidate telephone numbers might include the distance of the telephone numbers from the address. In this case, both candidate telephone numbers are separated from the address by approximately 150 terms. The features might also include whether any boundary information exists between the telephone number and the address. In this case, two paragraph boundaries exist between the candidate telephone numbers and the address.

Some other features that are relevant to telephone numbers include whether common telephone number terms (e.g., call, calling, telephone, telephoning, phone, phoning, tel, tele, (T), T, etc.) appear within a predetermined number of terms before the telephone number, whether common facsimile number terms (e.g., fax, faxing, (F), F, etc.) appear within a predetermined number of terms before the telephone number, whether there is another telephone number between it and the address. In this case, the probability determination may result in a prediction that the 202-987-6543 telephone number candidate is more likely the telephone number that goes with the address than the 202-987-6542 telephone number candidate.

The candidate telephone numbers may be assigned confidence scores based on their probability of being associated with the address.

A business listing associated with the address may be formed or supplemented with information from the title and/or telephone number with the highest confidence score(s), as shown in FIG. 15. The business listing may include a link to a document associated with the business, address information for the business, a telephone number for the business, a snippet from a document that mentions the business, and/or one or more links to documents that refer to the business.

CONCLUSION

Systems and methods consistent with the principles of the invention may, given some landmark in a document (e.g., a postal address), attempt to find an attribute of the landmark (e.g., business information, such as a business name, telephone number, business hours, or a link to a web site or a map) in the document. While the preceding description focussed on finding business information associated with an address in a document, this need not be the case. In other implementations, the above processing may apply to other landmarks and attributes, such as finding the price (attribute) or a product identification number (attribute) associated with a product (landmark). Other types of landmarks and attributes that may appear in documents would be apparent to one skilled in the art.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5, 7, and 8, the order of the acts may be modified in other implementations consistent with the principles of the invention. Further, non-dependent acts may be performed in parallel.

Also, it has been described that the probability that a candidate term is part of business information associated with an address is based on features, such as a window of terms around the term, a prediction regarding a previous term, and attributes, boundary information, and punctuation associated with one or more terms in the window. In another implementation, more, fewer, or different features may be used to predict whether a candidate term is part of business information associated with an address.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more processors associated with one or more server devices, the method comprising:

identifying, by one or more processors associated with one or more server devices, a document that includes a geographical address;

analyzing, by one or more processors associated with one or more server devices, a plurality of terms that precede the address in the document;

locating, by one or more processors associated with one or more server devices, at least one candidate title in the document by:

generating, by one or more processors associated with one or more server devices, a statistical model by analyzing features associated with a plurality of documents with known addresses and associated titles, calculating, by one or more processors associated with one or more server devices, based on the generated statistical model, a probability that each of the plurality of terms is part of a title associated with the address, and identifying, by one or more processors associated with one or more server devices, the at least one candidate title based on the probability that one or more of the plurality of terms, or one or more groups of the plurality of terms, is part of the title associated with the address;

assigning, by one or more processors associated with one or more server devices, a confidence score to the at least one candidate title based on the probability that one or more of the plurality of terms is part of the title associated with the address; and determining, by one or more processors associated with one or more server devices, whether to associate the at least one candidate title with the address based on the assigned confidence score.

2. The method of claim 1, where the plurality of terms include a first term that immediately precedes the address in the document and one or more second terms that precede the first term in the document.

3. The method of claim 1, where determining a probability that each of the plurality of terms is included in a title includes:

predicting, by a processor associated with the server device, whether one of the plurality of terms is part of the title, and predicting, by a processor associated with the server device, whether another one of the plurality of terms is part of the title based on the prediction regarding the one of the plurality of terms.

4. The method of claim 1, where the probability that one of the plurality of terms is included in a title is based on a window of terms around the one of the plurality of terms.

5. The method of claim 1, where the probability that one of the plurality of terms is included in a title is based on the probability associated with another one of the plurality of terms.

6. The method of claim 1, where the probability that one of the plurality of terms is included in a title is based on a set of features associated with the one of the plurality of terms.

7. The method of claim 6, where the set of features includes at least one of:
- a distance of the one of the plurality of terms from the address,
- characteristics of the one of the plurality of terms,
- boundary information between the one of the plurality of terms and a preceding or following one of the plurality of terms, or
- punctuation information between the one of the plurality of terms and a preceding or following one of the plurality of terms.

8. The method of claim 1, where determining whether to associate the at least one candidate title with the address includes:
- analyzing, by a processor associated with the server device, strings of terms in the document, and
- identifying, by a processor associated with the server device, one of the strings that maximizes a probability that the terms of the string include the at least one candidate title.

9. The method of claim 1, further comprising:
- creating or supplementing, by a processor associated with the server device, a business listing based on the at least one candidate title and the address when the at least one candidate title is associated with the address.

10. A system, comprising:
- means for identifying a document that includes a geographical address;
- means for analyzing a plurality of terms that precede the address in the document;
- means for locating one or more candidate titles in the document, including:
  - means for generating a statistical model by analyzing features associated with a plurality of documents with known addresses and associated titles,
  - means for determining, based on the generated statistical model, a probability that each of the plurality of terms is part of a title associated with the address, and
  - means for identifying the one or more candidate titles based on the probability that each of the plurality of terms is part of the title associated with the address;
- means for assigning a confidence score to each of the one or more candidate titles based on the probability that each of the plurality of terms is part of a title associated with the address; and
- means for determining whether to associate one of the one or more candidate titles with the address based on the assigned confidence score.

11. The system of claim 10, where the probability that each of the plurality of terms is included in a title is based on a set of features associated with each of the plurality of terms.

12. The system of claim 11, where the set of features includes at least one of:
- a distance, within the document, of each of the plurality of terms from the address,
- characteristics of each of the plurality of terms,
- boundary information between each of the plurality of terms and a preceding or following term of the plurality of terms, or
- punctuation information between each of the plurality of terms and a preceding or following term of the plurality of terms.

13. A system, comprising:
- a memory to store a statistical model; and
- a processor, associated with the memory, the processor to:
  - identify a document that includes a geographic address,
  - analyze a plurality of terms that precede the address in the document,
  - generate the statistical model by analyzing features associated with a plurality of documents with known addresses and associated titles,
  - calculate, based on the statistical model, a probability that each of the plurality of terms is part of a title associated with the address,
  - identify one or more candidate titles based on the probability that one or more of the plurality of terms, or one or more groups of the plurality of terms, is part of the title associated with the address, and
  - determine whether to associate the one or more candidate titles with the address based on the probability.

14. The system of claim 13, where the plurality of terms includes a first term that immediately precedes the address in the document and one or more second terms that precede the first term in the document.

15. The system of claim 13, where when determining a probability that each of the plurality of terms is included in a title, the processor is to:
- predict whether one of the plurality of terms is part of the title, and
- predict whether another one of the plurality of terms is part of the title based on the prediction regarding the one of the plurality of terms.

16. The system of claim 13, where the probability that one of the plurality of terms is included in a title is based on a window of terms around the one of the plurality of terms.

17. The system of claim 13, where the probability that one of the plurality of terms is included in a title is based on the probability associated with another one of the plurality of terms.

18. The system of claim 13, where the probability that one of the plurality of terms is included in a title is based on a set of features associated with the one of the plurality of terms.

19. The system of claim 18, wherein the set of features includes at least one of:
- a distance of the one of the plurality of terms from the address,
- characteristics of the one of the plurality of terms,
- boundary information between the one of the plurality of terms and a preceding or following one of the plurality of terms, or
- punctuation information between the one of the plurality of terms and a preceding or following one of the plurality of terms.

20. The system of claim 13, where when determining whether to associate the one or more candidate titles with the address, the processor is to:
- analyze strings of terms in the document, and
- identify one of the strings that maximizes a probability that the terms of the string include the one or more candidate titles.

21. The system of claim 13, where the processor is further to create or supplement a business listing based on the one or more candidate titles and the address when the one or more candidate titles is associated with the address.

22. A method implemented by a processor associated with a server device, the method comprising:
- identifying, by a processor associated with the server device, a document that includes a geographical address;
- analyzing, by a processor associated with the server device, a plurality of terms that precede the address in the document;

generating, by a processor associated with the server device, a statistical model by analyzing features associated with a plurality of documents with known addresses and associated titles;

determining, by a processor associated with the server device, and based on the generated statistical model, a probability that each of the plurality of terms is part of a title associated with the address;

identifying, by a processor associated with the server device, a candidate title, based on one or more of the plurality of terms that have a probability of being part of a title associated with the address;

assigning, by a processor associated with the server device, a confidence score to the candidate title; and determining, by a processor associated with the server device, whether to associate the candidate title with the address based on the assigned confidence score.

23. The method of claim 22, where a probability that one of the plurality of terms is included in a title is based on a set of features associated with the one of the plurality of terms.

24. The method of claim 23, where the set of features includes at least one of:

a distance, within the document, of the one or more of the plurality of terms from the address, characteristics of the one or more of the plurality of terms, boundary information between the one or more of the plurality of terms and a preceding or following term of the one or more of the plurality of terms, or punctuation information between the one or more of the plurality of terms and a preceding or following term of the plurality of terms.

25. A method implemented by a processor associated with a server device, the method comprising:

identifying, by a processor associated with the server device, a document that includes an address;

identifying, by a processor associated with the server device, a set of candidate telephone numbers in the document;

generating a statistical model by analyzing features associated with a plurality of documents with known addresses and associated telephone numbers;

determining, by a processor associated with the server device, and based on the generated statistical model, a probability that each candidate telephone number in the set of candidate telephone numbers is associated with the address;

selecting, by a processor associated with the server device, one of the candidate telephone numbers based on the determined probability, and storing the selected one of the candidate telephone numbers in association with the address in a memory.

26. The method of claim 25, where the probability that one of the set of candidate telephone numbers is associated with the address is based on a set of features associated with the candidate telephone number.

27. The method of claim 26, where the set of features includes at least one of:

a distance, within the document, of the one of the set of candidate telephone numbers from the address, boundary information between the one of the set of candidate telephone numbers and the address, whether a particular telephone number term appears before the one of the set of candidate telephone numbers, whether a particular facsimile number term appears before the one of the set of candidate telephone numbers, or whether another candidate telephone number exists between the one of the set of candidate telephone numbers and the address.

28. A method implemented by a processor associated with a server device, the method comprising:

identifying, by a processor associated with the server device, a web page that includes a postal address;

identifying, by a processor associated with the server device, an attribute in the web page, the attribute corresponding to information relating to one of:

business hours associated with the postal address, a link to a web site associated with the postal address, or a link to a map associated with the postal address;

assigning, by a processor associated with the server device, a confidence score to the attribute, the confidence score relating to a probability that the attribute is associated with the postal address;

selecting, by a processor associated with the server device, the attribute based on the assigned confidence score, and storing the selected attribute in association with the postal address in a memory.

29. The method of claim 28, where the probability that the attribute is associated with the postal address is generated by a statistical model generated by analyzing, by a processor associated with the server device, features associated with a plurality of documents with known postal addresses and associated attributes.

30. The method of claim 28, further comprising:

creating or supplementing, by a processor associated with the server device, a business listing based on the attribute and the postal address when the attribute is associated with the postal address.

31. A method implemented by a processor associated with a server device, the method comprising:

identifying, by a processor associated with the server device, a web page that includes a product;

identifying, by a processor associated with the server device, a price or a product identification number associated with the product;

assigning, by a processor associated with the server device, a confidence score to the price or the product identification number, the confidence score relating to a probability that the price or the product identification number is associated with the product; and determining, by a processor associated with the server device, whether to associate the price or the product identification number attribute with the product based on the assigned confidence score.

32. The method of claim 31, where the probability that the price or the product identification number is associated with the product is generated by a statistical model generated by analyzing, by a processor associated with the server device, features associated with a plurality of documents associated with known products and associated prices or product identification numbers.

33. The method of claim 31, further comprising:

creating or supplementing, by a processor associated with the server device, a business listing based on the price or the product identification number and the product when the price or the product identification number is associated with the product.

34. A system, comprising:

means for identifying a document that includes a geographical address;

means for identifying one or more candidate telephone numbers in the document, including:

means for generating a statistical model by analyzing features associated with a plurality of documents with known addresses and associated telephone numbers, and means for determining, based on the generated statistical model, a probability that each of the one or more candidate telephone numbers is associated with the address;

means for assigning a confidence score to each of the one or more candidate telephone numbers based on the probability that each of the one or more candidate telephone numbers is associated with the address; and means for selecting one of the one or more candidate telephone numbers based on the assigned confidence score, and means for storing the selected one of the one or more candidate telephone numbers in association with the address.

35. The system of claim 34, where the probability that each of the one or more of the candidate telephone numbers is associated with the address is based on a set of features associated with each of the one or more candidate telephone numbers.

36. The system of claim 35, where the set of features includes at least one of a distance of each of the one or more the candidate telephone numbers from the address, boundary information between each of the one or more the candidate telephone numbers and the address, whether a common telephone number term appears before each of the one or more the candidate telephone numbers, whether a common facsimile number term appears before each of the one or more candidate telephone numbers, or whether another of the one or more of the plurality of candidate telephone numbers exists between the each of the one or more candidate telephone numbers and the address.

* * * * *